Feb. 5, 1963

W. E. ROTHE 3,076,452

DIAGNOSTIC AID

Filed March 9, 1961

INVENTOR.
WILLIAM E. ROTHE
BY
ATTORNEYS

Feb. 5, 1963  W. E. ROTHE  3,076,452
DIAGNOSTIC AID
Filed March 9, 1961  3 Sheets-Sheet 3
FIG. 3
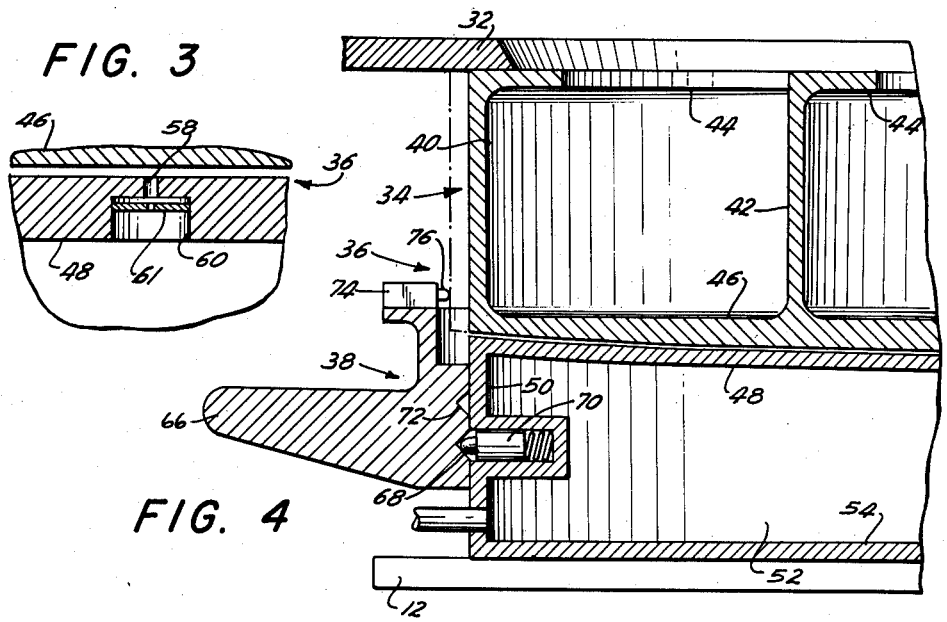
FIG. 4
FIG. 5
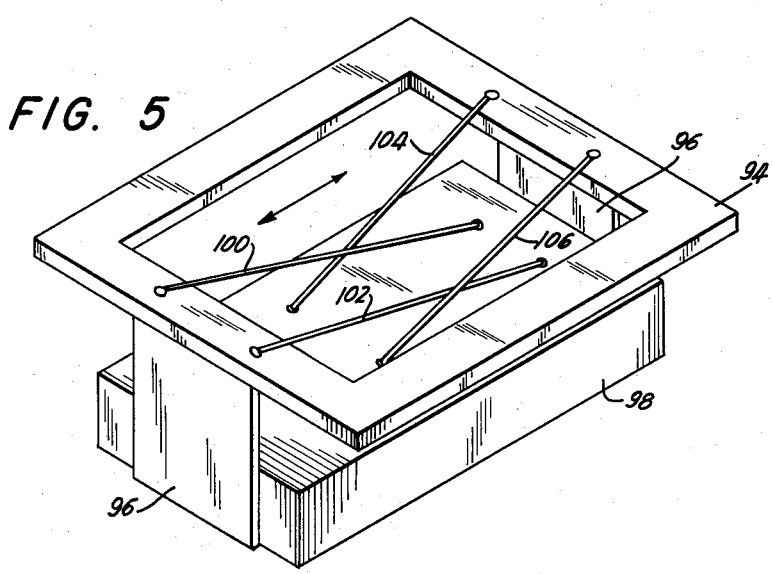
FIG. 6
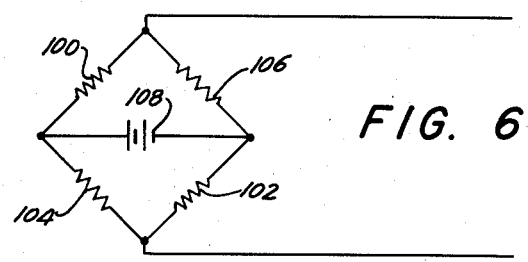
INVENTOR.
WILLIAM E. ROTHE
BY
ATTORNEYS 3,076,452
DIAGNOSTIC AID
Wilhelm E. Rothe, Huntsville, Ala., assignor to Astro-Space Laboratories, Inc., New York, N.Y., a corporation of New York
Filed Mar. 9, 1961, Ser. No. 94,509
15 Claims. (Cl. 128—2.05)

This invention relates to a diagnostic aid.

More particularly, my invention pertains to a diagnostic aid, i.e. instrument, which is capable of ascertaining the functional state of the heart, that is to say, a diagnostic aid which will analyze the muscular action of the heart. Such an instrument measures ballistic reaction forces engendered by contractions and expansions of the heart chambers and the varying expulsion flows of blood in varying quantities through the heart valves, arteries and veins. In other words, the instrument is, in effect, what is popularly known as a "ballistocardiograph."

Essentially, therefore, my invention is a motion analyzer for the dynamic forces at play within a body at terrestrial rest, the major dynamic force in the specific bodies to be analyzed being attributable to the action of the heart. By "terrestrial rest" I denote an object having a frame or support which is essentially static, i.e. experiences no appreciable overall motion relative to the earth, although there are forces at play within the body that are manifested by transitory quivers, i.e. slight momentary motions, of the frame. It will be understood that by the term "motion" I refer both to simple displacement and to derivative functions of motion, such, for example, as amplitude, velocity and acceleration, and to forces which create acceleration.

The diagnostic assistance of a ballistocardiograph is recognized in medical circles. It constitutes a valuable tool for the recognition of the symptoms of various heart conditions. Attempts heretofore have been made to construct ballistocardiographs but such diagnostic aids have until now constituted crude, expensive, cumbersome, inaccurate and delicate devices. In general I attribute the source of the difficulties of previous ballistocardiographs to two structural causes, one of these being the mode of suspension of the patient, or more specifically, of the support on which the patient rests, and the other being the mode of sensing the motions and forces at play in the patient's body.

As to the mode of suspension, various different systems heretofore have been provided. One was what might be termed a "seismograph" suspension. In it the support for the patient was suspended by several, e.g., four, wires from an overhead frame. But this type of support raised many difficulties. For instance, since the wires were supported from overhead, if the instrument was not to be made a part of the building, it became large and bulky and if it was made part of the building, it had to be assembled in situ. Further, if it was made part of the building, the length of the wires necessarily was limited. Because the wires were connected to a frame which in turn was tied into the building or floor, the wires conducted external vibrations to the support for the patient. These vibrations interfered with motion measurement, e.g., with acceleration measurement or velocity measurement, and created a host of secondary random vibrations in the range of frequency of the motion being measured which would mask and beat the motion function that was to be ascertained. Additionally, the fact that the wires essentially constituted a pendulum of comparatively short length created a resonant system having a natural frequency in the order of frequency of some of the motion functions which were to be measured to thereby additionally interfere with the desired measurements. Instruments employing the seismograph type suspension were so delicate that to obtain consistent usable readings all traffic and movement of any type whatsoever had to be halted for tens and sometimes hundreds of feet away from the instrument. Of course, this is impractical in any busy spot such as a hospital or a doctor's office, so that such an instrument was capable of only intermittently obtaining measurements which were of any significance and the doctor never could be certain that even those measurements which he chose to accept as unaffected by outside vibrations were not in reality readings of motions other than those due to heart action. Also, a seismograph suspension required the services of a skilled operator and even then so much time had to be taken to suspend traffic, to obtain enough readings, to establish equilibrium, etc., that at best very few patients could be processed in a normal working day.

Another system of suspension was that of liquid suspension. In it the table on which the patient's body was secured was suspended by floating in a liquid. Among the principal drawbacks of this mode of suspension was that the viscosity of the liquid resisted and impeded the movements of the support thereby lowering the amplitude of the motion to be analyzed and so reducing the sensitivity of the system. Also, the surface tension of the liquid dampened the acceleration of the support. This too reduced the sensitivity of the system. Furthermore, the liquid mode of suspension obviously was bulky and very heavy. It too had the problem that vibrations within the building were transmitted to the patient's support where they would be sensed by the measuring instrument, so that the use of the liquid suspension system entailed a cessation of movement for a wide radius around the instrument or else false diagnoses would be secured. It further will be appreciated that any vibrations imparted to the liquid either by outside forces or by internal dynamic forces within the patient could set up vibrations in the mass of liquid which had its own natural period of vibration and harmonics thereof, all of which would interfere with, block, dampen and beat the true measurements to be obtained.

Still another system of suspension was one in which the patient-supporting table was mounted on rollers. These rollers were the source of considerable static and rolling friction and reduction of amplitude and, due to their elasticity at the zones of contact, dampened the the higher frequency forces. Moreover, it was customary with such a system of suspension, to include a centralizing spring mechanism which was detrimental to high frequency components and, in general, tended to falsify measurements.

Yet another system of suspension was that of a pneumatic pad, to wit, a still body of air contained within a bladder. Such an air pad likewise tended to induce dampening and friction and offered an uneven resistance to acceleration. This system also was proposed in connection with a centralizing spring mechanism which masked high frequency vibration, introduced its own resonance into the readings and variably lowered the amplitudes of the forces at play.

The second difficulty of existing ballistocardiographs was, as noted earlier, the mode of sensing the forces and motions at play in the patient's body. These forces and motions are of a miniscule order. Acceleration, for example, is measured in dynes/cm. Indeed, it is because the forces and motions are so tiny that they can be so easily dampened, blocked, beat, lowered in amplitude, and otherwise deleteriously affected, so as to render the instruments so vulnerable to faults in its structurable constitution and to external sources of vibration. Even if external vibrations are suppressed, i.e., if the ballistocardiograph support is arranged to be sensitively responsible to the forces and motions of the patient's quiescent body and completely insensitive to outside forces and motions, and extremely sensitive pickup, i.e. sensing, means should be included so as to truly reflect with a high frequency response, a precise measurement and recordal of the motions which prevail. Preferably, the derivative function of motion which is sensed and recorded is acceleration or force inasmuch as it is fluctuations of force which the doctors want to measure for diagnostic purposes. The ballistocardiograph, hence, desirably senses accelerational force directly rather than, as heretofore, sensing displacement or motion and from them computing, as with electric circuits, the forces or accelerations which prevail.

It is, therefore, an object of my invention to provide a motion analyzer of the character described, e.g. in the form of a diagnostic aid, which overcomes all of these drawbacks.

It is another object of my invention to provide a motion analyzer of the character described which is particularly insensitive to outside influences so that accurate readings can quickly be obtained without attempting to control external forces.

It is another object of my invention to provide a motion analyzer of the character described which is capable of sensing vibration over a wide range of amplitudes and frequencies and of providing signals which are a faithful reproduction thereof.

It is another object of my invention to provide a motion analyzer of the character described which does not noticeably affect the amplitude of or dampen motion frequencies of a critical nature and particularly which does not affect high frequency forces.

It is another object of my invention to provide a motion analyzer of the character described which reduces the friction opposing motion of the support to a level which does not noticeably affect readings of the instrument.

It is another object of my invention to provide a motion analyzer of the character described which is not affected by elastic deformation on any other form of energy absorbing mechanism.

It is another object of my invention to provide a motion analyzer of the character described which constitutes relatively few and simple parts, is inexpensive to make, is fool-proof in operation and is durable in construction.

It is another object of my invention to provide a motion analyzer of the character described having a motion sensing means which is particularly sensitive to a wide band of frequencies and which will, over this band, yield a flat response.

It is another object of my invention to provide a motion analyzer of the character described having a multiple axes sensitivity so that, for example, it can be responsive to and record transverse as well as longitudinal forces at play within a patient's body.

It is another object of my invention to provide a motion analyzer of the character described which will yield reliable and reproducible results.

It is another object of my invention to provide a motion analyzer of the character described having an improved arrangement for properly locating a patient on a table and support with the center of gravity of the patient, table and support approximately above the center of configuration of the motion analyzer.

It is another object of my invention to provide a motion analyzer of the character described having a highly simplified arrangement for varying the position of the table with respect to its support whereby, if desired, to quickly and easily alter the center of gravity of the patient with respect to the center of balance of the motion analyzer.

Other objects of my invention in part will be obvious and in part will be pointed out hereinafter.

My invention accordingly consists in the features of construction, combinations of elements, and arrangements of parts which will be exemplified in the device hereinafter described, and of which the scope of application will be indicated in the appended claims.

In the accompanying drawings, in which are shown various possible embodiments of my invention, FIG. 1 is a side elevational view, partially in section, of a ballistocardiograph constructed in accordance with my invention;

FIG. 3 is an enlarged view of a portion of the externally pressurized gas bearing;

FIG. 4 is an enlarged view of the means for detecting off-center displacement of the movable element of the gas bearing;

FIG. 5 is a perspective view of the operating parts of the accelerometer; and

FIG. 6 is an electric diagram of the measuring circuit for the accelerometer.

Figure 1:
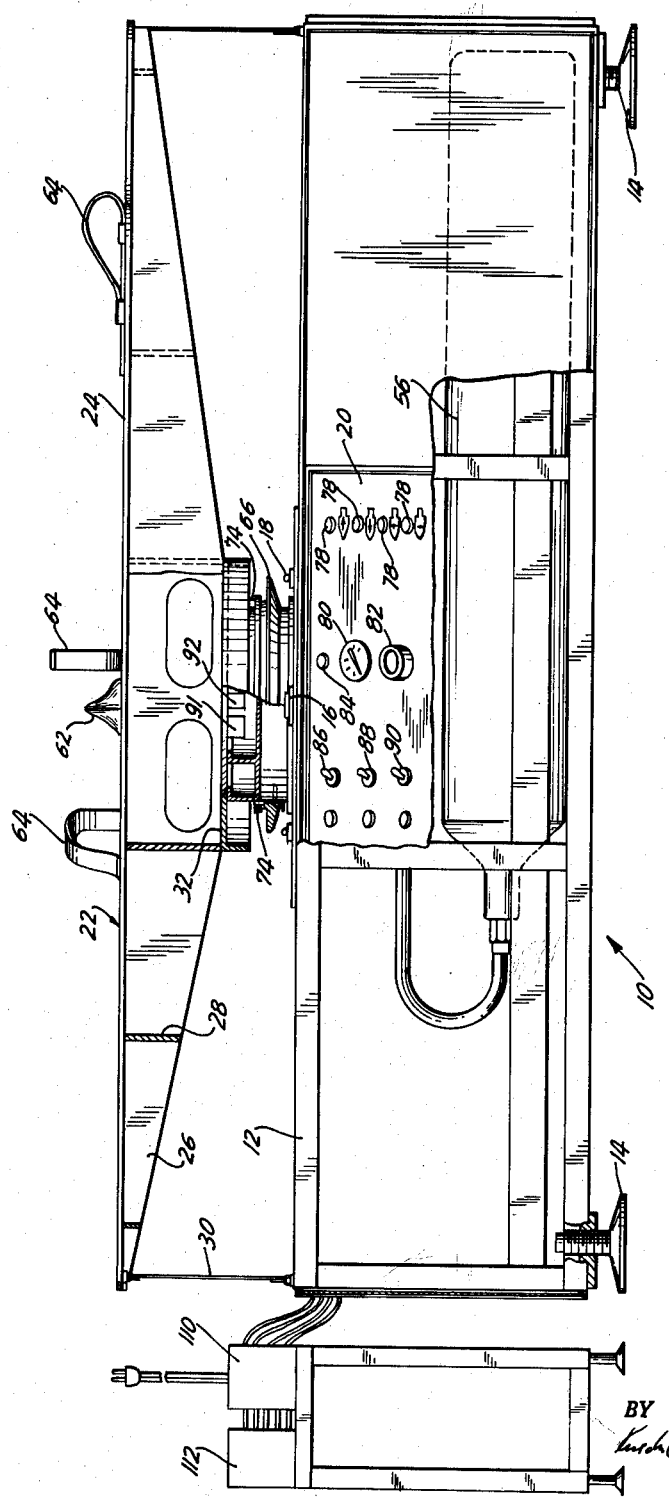
Figure 2:
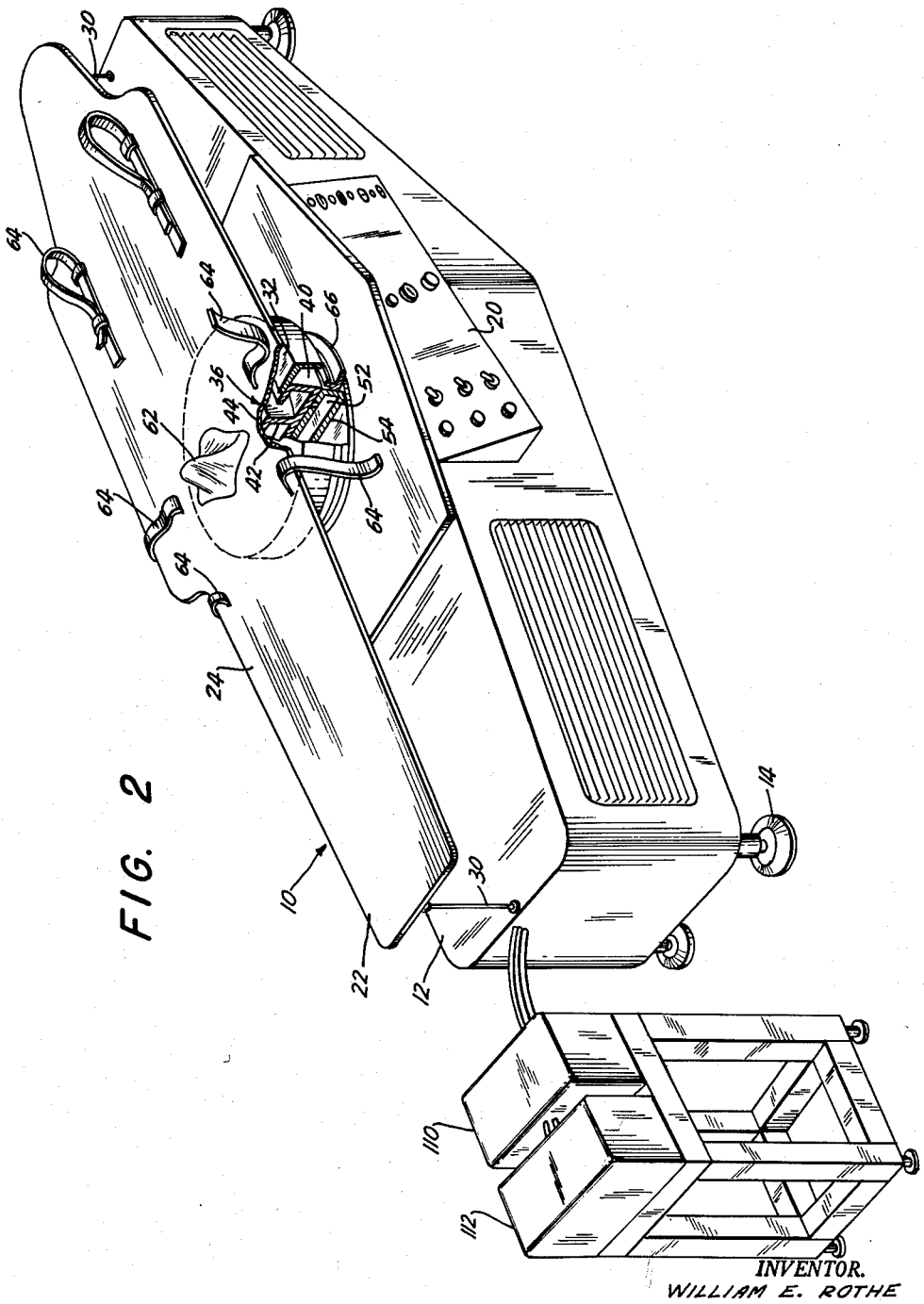
FIG. 2 is a perspective view of said ballistocardiograph.

In general I accomplish the several objects of my invention by suspending the patient support table through the medium of an externally pressurized gas bearing, i.e. a pressurized air film. I have found that not only does this reduce to a negligible quantity the friction between the movable table and its stationary base but it also isolates said table against exterior disturbances, these principally being exterior vibrations. Moreover by utilizing such a bearing I am able with extreme ease to provide a comparatively low frequency of resonant vibration for the table. That is to say the table can, in effect, be supported to act effectively as a long pendulum without the inconvenience of a physically pendulous support.

Still further, I have found that an externally pressurized gas bearing makes the table highly sensitive to minute accelerative forces so that not only do these forces faithfully create minute accelerations of proper amplitude of the table but they faithfully reproduce accelerations of high frequencies, for example, as high as 50 cycles per second which is the highest frequency that needs to be read by a ballistocardiograph for good diagnosis.

Furthermore, an externally pressurized gas bearing is a very simple mechanical arrangement that can be inexpensively made and does not require a skilled mechanic to maintain. Nor is such a bearing noticeably affected by change in temperature or humidity or by changes in viscosity of lubricant as is an ordinary bearing. Nor is such a bearing subject to energy absorption by elastic deformation of parts thereof as is the case, for instance, with wire supports, roller supports and pad supports.

Other advantages accruing from the use of such a bearing will be apparent as this description proceeds.

In addition, pursuant to an ancillary feature of my invention, I employ a strain gauge type of accelerometer which is sensitive to the tiniest of forces and which has a high fidelity flat response over a wide ratio of amplitudes and a wide range of frequencies.

Referring now in detail to the drawings, the reference numeral 10 denotes a motion analyzer, to wit, a ballistocardiograph, constructed in accordance with my invention. Said ballistocardiograph includes a stationary base or frame 12 adapted to be placed on a floor and preferably to have its upper surface adjusted to a horizontal position by means of adjustable legs 14. A longitudinal bubble level 16 and a transverse bubble level 18 is disposed on the top of the base in order that the same may be set in a substantially exact horizontal orientation. Conventionally this setting only will be made once when the machine is initially installed and will have to be readjusted only in the event that the base is accidentally dislodged. An instrument and control panel 20 conveniently is located on the front of the base although it will be appreciated that the same may be placed at any other desirable site. Various indicators and controls which will be described later are mounted on this panel.

To support a patient of whom a ballistocardiograph reading is to be taken, I provide a flat-topped table 22. The mass of the table should be small compared to the average weight of a human being so that the combined mass of the patient and table can experience a maximum excursion under the influence of the tiniest forces at play within the patient's body. However the table should be rigid so as not to introduce other (false) motions caused by elastic deformation. Accordingly, the entire table preferably is made from a light weight stiff material. For instance, the table desirably is made from an aluminum honeycomb material. In particular the table includes a flat top 24 of such material, the top being rather thin, plane and horizontal and being reinforced by longitudinal trusses 26 and vertical trusses 28 secured to the undersurface of the table. All the trusses are tapered toward their ends so as to keep weight to a minimum and the deep central sections of the trusses preferably are perforated in order likewise, to reduce the weight. I have found that with this arrangement I am able to obtain a table the weight of which does not exceed ten lbs. and indeed be even as light as approximately six pounds. As a precaution, the ends of the table are connected to the ends of the base by safety straps 30 which normally are loose and the only function of which is to prevent undue movement of the table.

Across the trusses, beneath the center of the table, I rigidly attach a centrally apertured flat disc 32 which is permanently secured to the trusses and table and the lower surface of which rests on but is not otherwise connected than by friction to the upper or movable section of an externally pressurized gas bearing 36. The lower or stationary section 38 of the gas bearing is rigidly secured to the top of the stationary base 12.

The upper section 34 constitutes an outer ring 40 and an inner ring 42 concentrically located within the outer ring. Both rings have inturned stiffening flanges 44 at their upper edges forming a plane surface on which the disc 32 rests. The lower edges of the two rings are integral with an upper curved plate 46 which forms the operational part of the upper section 34 of the gas bearing. A matching lower curved plate 48 forms the operational part of the lower section 38 of said gas bearing. Said lower curved plate 38 is supported by a circular side wall 50 the external diameter of which is approximately the same as the external diameter of the outer ring 40. The curvatures of the two plates 46, 48 are substantially the same. That is to say the shapes of these two plates are such that the two plates match one another in contour. The match must be very good, that is to say the deviation of any one plate from its proper configuration is in the order of less than one thousandth of an inch. The desired contour is secured, for example, by grinding the plates against one another with a grinding or lapping compound forming a film therebetween.

In the preferred form of my invention each of the plates 46, 48 is a segment of a sphere (a spherical sector) so that the upper plate can move freely (without interference) relative to the lower plate about either of two orthogonal axes. Thereby, in effect, the upper plate can experience a pendulous movement about two horizontal orthogonal axes with respect to the lower plate providing that the upper plate can slide over the lower plate. Of course such a movement can not be experienced while the plates contact one another. However their mode of separation soon will be described. The lower section 38 includes a plenum chamber 52 which faces the undersurface of the lower spherical sector. For example, said chamber may be defined by the lower plate 48, the circular side wall 50 and a bottom wall 54, said bottom wall resting upon the stationary base 12.

Gas, e.g. air, under pressure is supplied to the plenum chamber 52 from any suitable source as, for example, from a flask 56 in which compressed air or any other compressed gas is stored. Or, if desired, air under pressure may be supplied from a compressed air tank (not shown) into which air is pumped from a compressor (not shown). Still further, if desired, compressed air may be fed to the plenum chamber directly from an air compressor. It may be noted that only a mild air pressure is required, for example, 10 p.s.i.

The lower curved plate 48 is provided with a plurality of upwardly facing tiny nozzles 58. These nozzles preferably are symmetrically arranged with respect to the center of the lower plate, being located, for example, in a ring at about two-thirds of the radius of the lower plate 48. By way of illustration I have secured satisfactory results with an air bearing one foot in diameter with twenty-four nozzles arranged in a ring of eight inch diameter. Each nozzle 58 constitutes a tiny opening, e.g. an opening of about 0.02 inch in diameter which extends upward from a cavity 60 in the undersurface of the plate. Optionally, a restrictor 61 may be located in the top wall of the cavity said restrictor conveniently constituting a disc of aluminum foil having a tiny opening located beneath the nozzle, for example, an opening of about 0.005 inch in diameter. The purpose of the restrictor is to limit the rate of flow of the pressurized gas into and through the aforesaid nozzle.

The upper curved plate 46 is smooth and imperforate so that when gas under pressure is present in the nozzles 58 it will exert a pressure against the entire undersurface of the upper curved plate 46 and will lift the same. The gas issuing from the nozzles will flow between the gap now present between the two curved plates and out from the periphery between said plates. The pressure exerted by the gas film on the upper plate is inversely proportional to the rate of flow of said gas to the outside atmosphere.

If the upper curved plate 46 lies flat against the nozzles the flow rate is zero and the static pressure of the gas exists in the film. The total force exerted by this film is obviously greater than the load of the table (including the patient) so that a gap (pressurized film) will be created between the two plates. As the gap opens the lifting force reduces so that an equilibrium flow of the pressurized gas will be quickly established which balances the gravitational force of the load and the lifting force exerted by the pressurized gas film. In other words, this pressurized gas film will sustain the upper plate a short distance above the lower plate so that, in effect, the upper plate is floating on a moving pressurized film of air between the plates.

Since both plates are spherical sectors the upper plate will seek an equilibrium position in which the center of gravity of said plate, the table and the patient are lowermost, subject to any internal forces within this system, specifically, the internal forces generated within the patient's body. Such forces will tend to accelerate the table in the direction opposite to said forces, the acceleration being a result of a reaction force equal and opposite to the exerted force. The film of air does not impose any noticeable frictional restraint in the order of even the minute reaction forces that are to be measured, nor is there any physical contact between the plates which would dampen or reduce the amplitude of any motions of the upper curved plate 46. Furthermore, I have observed that although this externally pressurized gas bearing has a friction coefficient which is so low as to be negligible in comparison to the tiny forces at play, the bearing is stiff in the sense that vibrations experienced by the stationary lower curved plate are not readily transmitted to the upper curved plate. I also should point out that these excellent results are obtained with any type of gas, although I prefer to use air since it is the least expensive.

It additionally should be mentioned that excellent results are secured where the two plates are spherical since this permits a three dimensional pendulous movement of the table; however, it is within the scope of my invention to restrict such movement, for example, to a two dimensional pendulous movement or even to plane horizontal movement by using appropriate matched configurations for the two plates of the bearing. Nevertheless, the three dimensional pendulous movement is preferred inasmuch as it simplifies the structure and minimizes restraining forces. It also avoids the necessity of employing any mechanical centralizing systems such for instance as a centralizing spring mechanism.

I also should point out that I prefer to use curved plates in the externally pressurized gas bearing since the same allow me to obtain the equivalent of a pendulous movement of a large radius without actually physically providing a long pendulum arm. Thus in the form of my invention shown herein I have utilized a radius of curvature of twenty-four feet giving the equivalent of a pendulum length of twenty-four feet. A pendulum of such length has a comparatively long period, that is to say, long in comparison with the lowest frequency which is significant in connection with a ballistocardiograph reading. In this connection it should be observed that the significant frequencies for ballistocardiographic readings range from about three to fifty cycles per second and that the amplitude of the forces at play have a ratio of one to thirty or larger while the significant peaks and valleys are in time sequences of from about 0.05 second to 0.1 second with allowable tolerances of about ±0.02 second. The natural frequency of a pendulum having a length of 24 feet is less than 0.2 cycle per second so that it will be appreciated that the natural frequency of the table will not noticeably effect the output readings of the ballisocardiograph. Desirably the natural frequency to be selected for the support should not exceed one-tenth of the lowest significant frequency.

With the air pressure indicated and the sizes of plates set forth, the average width of the gap between the two curved plates is in the range of 0.001 inch so that it will be appreciated that the surfaces of these plates should be true to a lesser tolerance, preferably in the order of 0.0001 inch or less in order to prevent any contact between the metal surfaces.

It will be understood that when no gas under higher than atmospheric pressure is present in the plenum chamber the upper section 34 of the gas bearing will rest in direct physical contact upon the lower section 38 thereof, but that as soon as a sufficiently high (although mild) gas pressure is provided in the plenum chamber, the upper section will float free and will quickly assume an equilibrium position with the center of gravity of the table and patient lowermost.

Pursuant to an ancillary feature of my invention I provide a protruding means on the table to locate a patient's crotch in such position that the patient's center of gravity is at about the center of configuration of the gas bearing. Such means, as illustrated, comprises a vertical saddle 62 in the form of an erect element having a flat or broadly curved surface facing toward that end of the table 22 where the head of the patient will be located. This surface of the saddle is sufficiently wide to comfortably fit within the crotch of the patient in much the same fashion as a bicycle seat, with the patient, of course, in an outstretched supine position.

A plurality of thigh, abdomen and shoulder straps 64 are attached to the table and are provided with clamp (friction) buckles to enable a patient to be firmly secured to the table in order to obtain a positive strapdown. This is of great importance since the minute forces generated within the patient's body should be transferred to the table with as little dampening and change in amplitude as possible. Any relative motion between the patient's skeletal structure and the table which may be introduced by relative movement of the skeletal structure and the flesh of the patient tends to falsify reading and suppress high frequency components. This can be greatly reduced by a positive strap-down. It should be mentioned that by employing longitudinal and vertical trusses for the table and by utilizing a honeycomb stiffening structure for said table, the table, despite its light weight and thinness, is quite rigid and will not tend to experience elastic relative motion of its parts whereby to introduce false readings or dampen high frequency components.

In order to obtain maximum uniformity of results it is preferable to have the table 22 substantially horizontal, that is to say to have the upper section of the pressurized gas bearing substantially coincident with the lower section whereby the upper curved plate is, to all intents and purposes, horizontal. This condition will prevail if the center of gravity of the two mass system constituting on the one hand the patient and on the other the table, its trusses and the upper section 34 of the gas bearing is substantially at the center of balance of the instrument (center of configuration of the gas bearing). The location of the saddle 62 is helpful in this connection. Said saddle is so positioned on the table that when and average person is stretched out on the table with the saddle snugly fitted in his crotch, the overall center of gravity of the two mass systems will be substantially at the center of balance of the instrument. Nevertheless it will be appreciated that patients deviate from a norm due to varying states of health, bodily conditions and other irregularities. Hence, the ballistocardiograph preferably includes provision for enabling the table to be shifted with respect to the upper section 34 of the pressurized gas bearing. It is for this purpose that the apertured disc 32 simply rests upon the annular stiffening flanges 44. Said table thereby can be shifted longitudinally or transversely with respect to the flanges which are part of the upper section of the gas bearing, the friction between the disc and the flanges sufficing to retain the table in any adjusted position. It will be understood that, if desired, the shifting of the table can be performed by the nurse, technician or physician who is carrying out the test by simple manual movement of the table. It also is within the scope of my invention optionally to include any desirable assisting means for effecting such shifting e.g. screws or motors.

To facilitate the use of the ballistocardiograph means further is included to check the center of gravity of the two mass system. Said means comprises a ring 66 mounted on the circular side wall 50 of the lower section of the gas bearing. Said ring is constrained for vertical movement between an upper position and a lower position. The upper position is defined by the reception into a lower internal notch 68 of a spring loaded bullet 70 supported in the wall 50 for radial movement. The lower position of said ring 66 is defined by the reception of the bullet in an upper internal notch 72 formed on the internal surface of said ring.

In its lower position the upper side, i.e. lip, of the ring 66 is clear of the upper section of the pressurized gas bearing and, specifically, is clear of the outer ring 40. That is to say, if, when the gas pressure is applied to the bearing, the center of gravity of the two mass systems is spaced from the center of balance of the instrument the upper section of the gas bearing will swing out of alignment with the lower section and the lowered ring 66 will not interfere with this swinging motion. However, when the ring 66 is raised its lip will lie in the path of such swinging motion of the upper bearing section and will prevent any wide excursion thereof.

It is desirable in the use of the ballistocardiograph to have the ring 66 raised when the patient first is strapped down on the table and while the instrument is being prepared but prior to taking any readings. The ring is lowered while readings are being taken.

Since the excursion of the upper section 44 due to improper placement of the patient on the table is desired to be held to a minimum in order to provide true longitudinal measurements of reaction forces, it is helpful to provide means for indicating to the operator of the ballistocardiograph when the patient and/or table is incorrectly located. This conveniently is accomplished in the form of my invention now being described by four sensors located in quadrantal sites on the lip of the ring 66, i.e. disposed 90° apart, with two diametrically opposed sensors lying on the longitudinal axis of the base, and two diametrically opposed sensors lying perpendicular to said longitudinal axis. Conveniently the sensors constitute momentary electric switches 74, e.g. microswitches, having their actuating fingers 76 radially disposed and facing toward the center of the externally pressurized gas bearing. These fingers are located quite close to the circumference of the outer ring 40 when said ring is centrally disposed and when the ring 66 is in elevated position so that a small movement (swinging deflection) of the upper section of the gas bearing will be detected by the switches. In a preferred form of my invention, the distance between the fingers and the outer ring 40 in the central position of the latter is about one-sixteenth of an inch, it being understood that this, as well as all other figures given in this specification, have been given merely by way of illustration and are not to be construed as limitations except to the extent indicated in the appended claims.

It thus will be seen that when the gas bearing is actuated by admission of gas under pressure into the plenum chamber so that the upper section 34 will float free, if the table and/or patient is improperly placed, the outer ring 40 will swing in a compensating direction. Such motion will be sensed by at least a pair and if the motion is not purely longitudinal or lateral by one switch of each pair of the switches 74. The gas bearing then may be deactuated and the table and/or patient shifted in an opposite direction to that indicated by the swing of the upper section of the bearing. It has been found that the adjustments required are, due to the use of the saddle, customarily quite small and can be quickly and easily effectuated by hand.

To expedite the leveling operation just described, each of the microswitches is series connected to a different signalling device comprising, for example an indicator in the form of a lamp. There are four such lamps 78 on the instrument panel 20, each one with a suitable marking to indicate either the direction of swing which is taking place or the direction which the table and/or patient must be moved to prevent the swing. It will be understood that when, with the ring 66 raised, the gas bearing actuated and a patient on the table, none of the lamps 78 is lit, the table 22 will be substantially horizontal. Thereupon the ring 66 can be lowered and the instrument used to obtain a reading.

The instrument panel 20 may include other controls. For instance, it may include an air pressure meter 80 which furnishes a reading of the air pressure in the plenum chamber 52. It further may include a knob 82 which controls an air pressure regulating valve by means of which the air pressure in the chamber can be varied at will to apply, if needed, a greater air pressure for particularly heavy patients, or a lesser air pressure for only light weight patients.

Also on the panel 20 I may mount a lamp 84 which is energized when the two sections of the gas bearing are separated from one another. For example, said lamp 84 may be energized upon the closure of a normally closed pair of contacts of a relay the coil of which is actuated by a circuit made through the two sections of the gas bearing. That is to say the energizing circuit for such relay is made through any point of contact of the two sections of the bearing so that when the upper section is floating the relay is idle and the said pair of contacts of the relay will be closed to complete the energizing circuit of the lamp 84, thereby lighting the lamp and indicating to the operator that the table and patient are floating.

Mention may be made of the fact that when the table and patient are in proper centralized position and gas pressure is turned on, the movement of the table is so slight that it is difficult to ascertain visually merely from inspection of the table and patient that the table is floating and, of course, it is not desired to touch the table or patient to see if the bearing is operating inasmuch as this would induce oscillatory motion of the table.

Other controls on the panel 20 may be a switch 86 which either turns on a compressor to supply air under pressure to the plenum chamber or opens an electrically controlled valve between the gas flask 56 and the plenum chamber. A switch 88 on the panel supplies excitation voltage to an electrocardiograph and to the motion sensing device soon to be described. A switch 90 on the panel connects the instrument to a source of electric power this being the source which energizes all of the circuits as distinguished from the switch 88 which when operated after closure of the switch 90 only supplies excitation voltage.

As indicated previously, the motion analyzer 10 includes a means responsive to the motion of the table 22, the term "motion" including both simple displacement and derivative functions such as velocity and acceleration, the latter being equivalent to force ($F = ma$.). Preferably the motion responsive means is sensitive to acceleration of the table 22 whereby to obviate electric or mechanical computations for converting other functions of motion into acceleration. The acceleration sensitive means desirably should have a substantially flat response in the significant range to be measured which is from about three to fifty cycles per second and should be able to handle variations in amplitudes in a ratio of one to thirty or larger. It also must be able to sense extremely tiny forces in the range of dynes/cm. and should have an immediate response without appreciable time lag.

I have found that an accelerometer which meets all these conditions is a spring supported mass having the deflection of the mass measured by unbanded strain gauges. Desirably two such accelerometers are employed, one to pick off, i.e. be responsive to, longitudinal acceleration of the table and the other to pick off transverse acceleraation of the table. The longitudinal accelerometer has been denoted by the reference numeral 91 and the transverse accelerometer by the reference numeral 92. Inasmuch as both of these accelerometers are of the same construction and differ only in their orientation, the following description is applicable to the two accelerometers.

The internal construction of the accelerometer is indicated in FIG. 4. The same constitutes a stationary frame 94 which is firmly connected to the upper section 34 of the externally pressurized gas bearing and thereby is rigidly tied to the table. Pendant from two spaced portions of the frame are parallel leaf springs 96 to the lower ends of which are securely affixed the opposite end edges of a mass 98. The leaf springs are registered and face each other in the direction between their ends bridged by the mass, this being the measuring direction of the accelerometer which is perpendicular to the broad faces of the springs. In the case of the longitudinal accelerometer 91 the aforesaid direction is lengthwise of the table and in the case of the transverse accelerometer 92 the aforesaid direction is perpendicular to the length of the table.

It will be apparent that when the frame 94 undergoes acceleration in the measuring direction it will experience a displacement relative to the mass and that such displacement is a measure of the acceleration. The displacement is translated into a signal, e.g. an electric signal, that is proportional to the acceleration by means of a strain gauge. By way of example I employ four unbonded strain gauge wires 100, 102 and 106. These wires are arranged in parallel pairs with a substantial component of their lengths parallel to the measuring direction. The pair of wires 100, 102 have one end of each anchored to one end of the frame 94 and the other end of each anchored to adjacent the remote side of the mass 98. The pair of wires 104, 106 are reversely disposed. All the wires are tensioned to about the same extent. Thereby when the mass and frame experience relative displacement in either sense along the measuring direction one pair of wires will have the strain therein increased while at the same time the other set of wires will have the strain therein decreased.

Said wires are connected in a suitable electric circuit to enable a signal to be obtained as a measure of acceleration. Such electric circuit is illustrated for instance in FIG. 6 and simply comprises a bridge circuit with the wires 100, 102 oppositedly paired to the wires 104, 106. A suitable source of D.C. excitation 108 or an A.C. actuated full wave rectifier bridge spans two opposite junctions of the strain wire bridge and the acceleration signal appears across the remaining junctions.

Accelerometers of the foregoing type are commercially available, one such accelerometer for instance being made by Statham Instruments Inc., 124–01 West Olympic Blvd., Los Angeles 64, California and being known as Accelerometer Model No. A3-2-350. Said accelerometer essentially is an electro-mechanical device which transduces minute displacements into resistance changes of strain-sensitive wire. The wires are connected in a resistive balanced completely unbonded strain gauge bridge. The electrical output of such a bridge is proportional to the applied stimulus, i.e. force, in the measuring direction.

As thus far described the motion analyzer will, with the table floating and the accelerometer energized, supply output signals which are functions of the longitudinal and transverse accelerations undergone by the body secured to the table as a result of forces at play within the body. These signals can be employed for any desired purpose, conceivably being utilizable for control or, optionally, being readable upon a transient meter.

However, primarily said signals are preferred to be recorded and for this purpose the motion analyzer desirably further incorporates a suitable recording system. Such recording system is entirely conventional and simply accepts, amplifies and provides a permanent record of the accelerometer signals. In the preferred form of my invention the recording system not only records transverse as well as longitudinal acceleration signals but also records one or more other concurrently measured functions of the cardiac system, e.g. it simultaneously may record one or more other measurements provided by an electrocardiograph or by a pulse sensing device and also by a timer.

To the foregoing end the recorder is preferably a multichannel recorder so that it can simultaneously record several events which are transpiring simultaneously with the ballistocardiographic accelerations. Such a recorder is indicated by the reference numeral 110. Since the recorder is quite conventional it will not be described in detail. It constitutes, for instance, an Offner Electronics Type R Dynograph which includes in input amplifier, a paper supply and take-up roll, means for moving the paper from the supply to the take-up roll over a flat surface, and a plurality of tracing needles one for each channel which needles course transversely to the direction of travel of the paper as functions of the signals fed to the means for moving the needles. Desirably one of the needles is actuated by a time pulse so that there is furnished a good base against which to check the recordings. Another of the needles desirably is actuated by the cartoid pulse. One or more other needles is actuated by the output from the terminals of an electrocardiograph 112. Of course other needles move in response to the signals furnished by the accelerometers 91, 92. Thereby, on a single sheet of paper I can simultaneously obtain various readings which it is desired to compare with the ballistocardiographic recordings.

I have found that the ballistocardiograph 10 is highly insensitive to exterior forces of vibration while at the same time being highly sensitive to the tiniest forces generated within a patient's body. The instrument quickly can be balanced and requires very little time for establishing equilibrium prior to measurements. The readings obtained with the instrument closely duplicate theoretical readings and, indeed, when the instrument is checked by feeding into the table a wide range of artificially generated frequencies over a wide amplitude flat and faithful responses were secured.

It will thus be seen that I have provided a device in which I achieve the several objects of this invention and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A motion analyzer comprising a stationary support, a subject support, an externally pressurized gas bearing interconnecting said supports, for relative slidable movement, said gas bearing including a stationary section functionally integral with the stationary support, a movable section functionally integral with the subject support, said stationary and movable sections having juxtaposed matching surfaces that are mutually slidable with respect to one another, the peripheries of said surfaces being exposed to ambient atmospheric pressure, at least one of said surfaces having an opening therein spaced from the peripheries of said surfaces, said opening being opposed to the opposite surface and means to supply gas under pressure through said opening to the region between the two said surfaces so as to provide a pressurized gas film between said surfaces with the gas in said film continuously escaping from the peripheries of said surfaces, and a motion responsive means rigidly connected to the subject support.

2. A motion analyzer comprising a stationary support, a subject support, an externally pressurized gas bearing interconnecting said supports for relative circular movement about an axis above the subject support, said gas bearing including a stationary section functionally integral with the stationary support, a movable section functionally integral with the subject support, said stationary and movable sections having juxtaposed matching surfaces that are mutually slidable with respect to one another, the peripheries of said surfaces being exposed to ambient atmospheric pressure, at least one of said surfaces having an opening therein spaced from the peripheries of said surfaces, said opening being opposed to the opposite surface and means to supply gas under pressure through said opening to the region between the two said surfaces so as to provide a pressurized gas film between said surfaces with the gas in said film continuously escaping from the peripheries of said surfaces, and a motion responsive means rigidly connected to the subject support.

3. A motion analyzer comprising a stationary support, a subject support, an externally pressurized gas bearing interconnecting said supports for relative circular movements about orthogonal axes above the subject support, said gas bearing including a stationary section functionally integral with the stationary support, a movable section functionally integral with the subject support, said stationary and movable sections having juxtaposed matching surfaces of spherical contour that are mutually slidable with respect to one another and have a common center of curvature at the point of intersection of said axes, the peripheries of said surfaces being exposed to ambient atmospheric pressure, at least one of said surfaces having an opening therein spaced from the peripheries of said surfaces, said opening being opposed to the opposite surface and means to supply gas under pressure through said opening to the region between the two said surfaces so as to provide a pressurized gas film between said surfaces with the gas in said film continuously escaping from the peripheries of said surfaces, and a motion responsive means rigidly connected to the subject support.

4. A motion analyzer comprising a stationary support, a subject support, an externally pressurized gas bearing interconnecting said supports for relative slidable movement, said gas bearing including a stationary section functionally integral with the stationary support, a movable section functionally integral with the subject support, said stationary and movable sections having juxtaposed matching surfaces that are mutually slidable with respect to one another, the peripheries of said surfaces being exposed to ambient atmospheric pressure, at least one of said surfaces having an opening therein spaced from the peripheries of said surfaces, said opening being opposed to the opposite surface and means to supply gas under pressure through said opening to the region between the two said surfaces so as to provide a pressurized gas film between said surfaces with the gas in said film continuously escaping from the peripheries of said surfaces, the natural frequency of said bearing being less than one tenth of the lowest significant frequency of motion of the subject to be analyzed, and a motion responsive means rigidly connected to the subject support.

5. A ballistocardiograph comprising a base, an elongated table, an externally pressurized gas bearing interconnecting said base and table for relative slidable movement, said gas bearing including a stationary section functionally integral with the base, a movable section functionally integral with the table, said stationary and movable sections having juxtaposed matching surfaces that are mutually slidable with respect to one another, the peripheries of said surfaces being exposed to ambient atmospheric pressure, at least one of said surfaces having an opening therein spaced from the peripheries of said surfaces, said opening being opposed to the opposite surface and means to supply gas under pressure through said opening to the region between the two said surfaces so as to provide a pressurized gas film between said surfaces with the gas in said film continuously escaping from the peripheries of said surfaces, and a motion responsive means functionally integral with the table.

6. A ballistocardiograph as set forth in claim 5 wherein the table includes an upwardly extending element for positioning a subject with his center of gravity near the center of configuration of the ballistocardiograph.

7. A ballistocardiograph as set forth in claim 6 wherein the positioning element is located to be received in the crotch of the patient.

8. A ballistocardiograph as set forth in claim 7 wherein the element is saddle-shaped.

9. A ballistocardiograph as set forth in claim 5 wherein the motion responsive means has a substantially flat frequency response in the frequency range of from about three cycles per second to about fifty cycles per second.

10. A ballistocardiograph as set forth in claim 5 wherein the motion responsive means is a strain gauge accelerometer.

11. A ballistocardiograph as set forth in claim 5 wherein two motion responsive means are provided, one of which is sensitive to motion longitudinal of the table and the other of which is sensitive to motion transverse of the table.

12. A ballistocardiograph as set forth in claim 5 wherein the gas bearing is pendulous and has a frequency less than 0.3 cycle per second.

13. A ballistocardiograph as set forth in claim 5 wherein the table rests on the gas bearing and is otherwise unconnected thereto so that it can be shifted relative to the gas bearing for locating the center of the two-mass system including the patient and the table in alignment with the center of configuration of the ballistocardiograph.

14. A ballistocardiograph as set forth in claim 5 wherein the table is mounted for movement relative to the gas bearing.

15. A ballistocardiograph as set forth in claim 14 wherein means is included to detect and indicate displacement of the center of gravity of the two-mass system constituting the table and patient from the center of configuration of the ballistocardiograph.

References Cited in the file of this patent

UNITED STATES PATENTS

| | | |
|---|---|---|
| 2,680,438 | Edwards | June 8, 1954 |
| 2,837,082 | Elliott | June 3, 1958 |

OTHER REFERENCES

Turner: "Ballistography" Mar.–Apr. 1951, Journal of Mount Sinai Hospital, New York, pgs. 1060, 1061, 1072.

Nickerson: "Design of Ballistocardiograph," Aug. 1, 1944, American Journal of Physiology, pgs. 1–11.